Oct. 1, 1968 J. HALABY 3,404,236

TELEPHONE AUTOMATIC ALARM APPARATUS

Filed Oct. 22, 1965

United States Patent Office 3,404,236

Patented Oct. 1, 1968

3,404,236

TELEPHONE AUTOMATIC ALARM APPARATUS

Josef Halaby, 681 Howard Ave., Apt. B4, Brooklyn, N.Y. 11212

Filed Oct. 22, 1965, Ser. No. 500,706
8 Claims. (Cl. 179—5)

ABSTRACT OF THE DISCLOSURE

An alarm apparatus in which use is made of available telephone circuits to communicate an alarm automatically in response to a disturbance such as a fire, burglary or the like. The apparatus includes a system of relays for interrupting the conventional circuit between a telephone and a central station and for substituting a source of a dialing signal and a message relating device. The dialing signal is generated by means of a motor which is provided with power upon the detection of a disturbance, this power also being supplied to the message relating device so that first there is generated a dialing signal and subsequently a message is related. A circuit is also provided for interrupting telephone conversations in order to clear the line for the message reporting the disturbance.

Figures 1, 2:
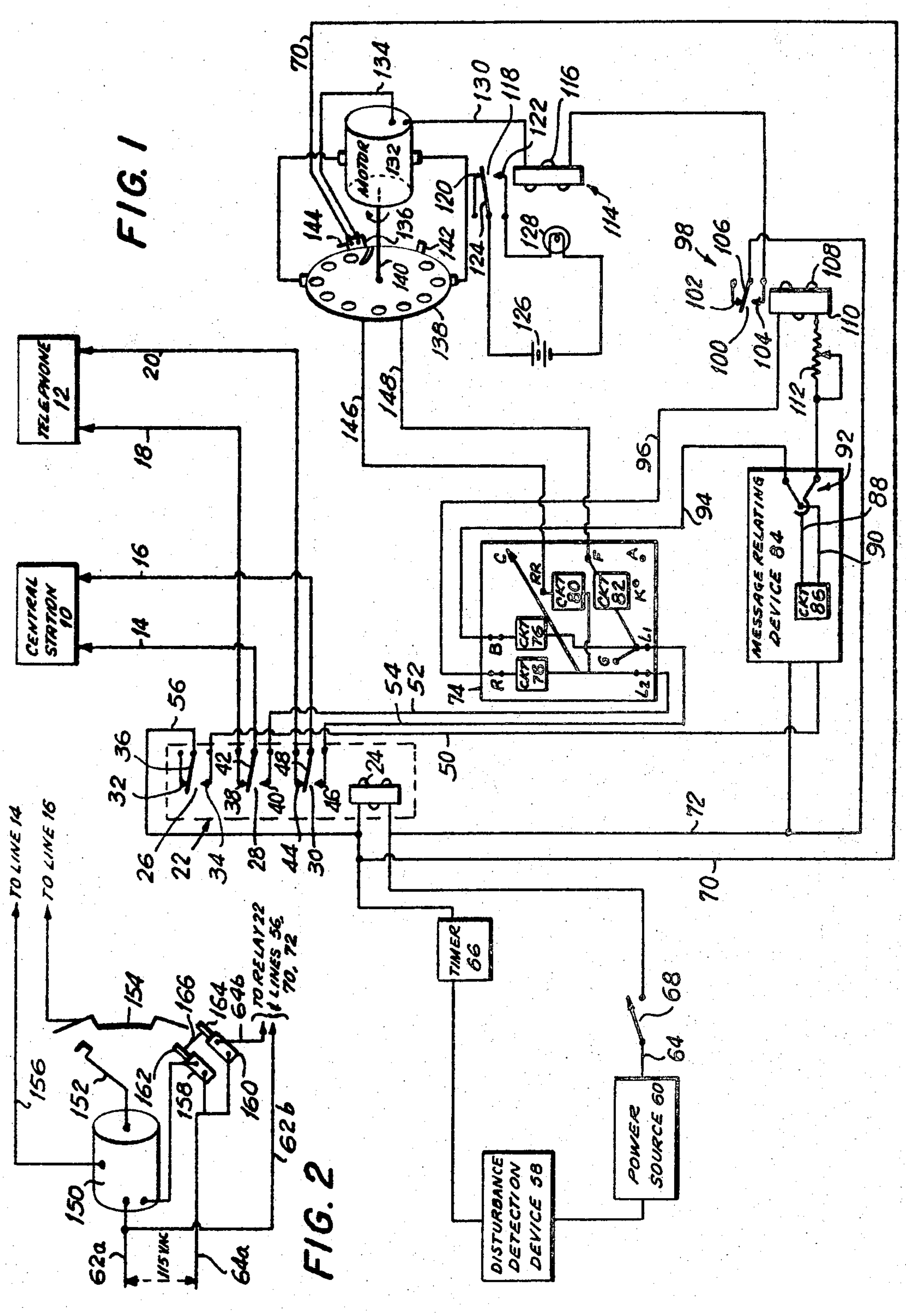

This invention relates to improvements in automatic alarm apparatus.

A type of alarm apparatus is known in which use is made of available telephone circuits to communicate an alarm automatically in respect of disturbances such as fires, burglaries and the like. Such known apparatus generally employs a disturbance detector which actuates a recorder which then relates a warning message into a telephone circuit to which the recorder is coupled.

With regard to such apparatus, it is a general object of the invention to provide improved circuits and arrangements whereby the conventional subscriber's telephone is maintained with a normal connection to the central station but in which upon the occurrence of a detectable disturbance the subscriber's telephone is disconnected from the central station and there is substituted in place of the subscriber's telephone a message relating device having improved characteristics to be described hereinunder.

Another aspect of the invention is to provide an improved alarm apparatus for use in combination with a telephone circuit which defers its message generating function until a dial tone has been received from the associated central station, thus indicating that the central station is available to receive a warning message.

Yet another object of the invention is to provide an improved alarm apparatus incorporating therein provision for terminating incoming calls upon the occurrence of a detectable disturbance so that it is possible to transmit a warning message with extreme priority.

Still another object of the invention is to provide an improved alarm arrangement which is adapted for restoring itself to its original inoperative condition after a determinable period of time.

Another object of the invention relates to the provision of improved means for visually indicating when the apparatus of the invention has been actuated.

Yet another object of the invention relates to the provision of an improved circuit for deferring actuation of a dialing mechanism until a dial tone is received, this object of the invention being achieved through a particular arrangement of a message relating unit and an electromechanical device or the like, as will be shown hereinafter.

Briefly, in achieving the above and other of its objectives, the invention proposes the use of apparatus for use with a central telephone station or the like comprising a telephone, message means for generating a message signal, switching means normally connecting the telephone to said central station and disturbance detection means for actuating the switching means to connect the message means to the central station in place of the telephone upon the detection of a disturbance, the detection means moreover actuating the message means to transmit a warning signal to the central station.

According to a further aspect of the invention, the central station is adapted to generate a dial tone signal, the apparatus of the invention further comprising dialing means coupled by the switching means to the central station concomitantly with the message means and control means coupled to the switching means to actuate the dialing means upon receipt of a dial tone from the central station.

The above apparatus, as will be show hereinafter, is readily produced with commercially available sub-assemblies or units and may be conveniently installed without interference with the operation of normal communication circuits. Additionally, the provision of an alarm apparatus as a unit separate from the conventional circuit permits its manufacture as a complete self-contained unit without recourse to the conventional telephone circuitry arrangements other than at the time of installation.

Other objects, features and advantages of the invention will become apparent from the following detailed description of a preferred embodiment as illustrated in the accompanying drawing, in which:

FIGURE 1 is a schematic, partially diagrammatic, illustration of an automatic alarm apparatus provided in accordance with a preferred embodiment of the invention; and FIGURE 2 illustrates an improvement to be incorporated in the circuit of FIG. 1.

The illustrated circuit is intended for use, for example, with a conventional central telephone station 10 at which will be stations, operators, or automatic apparatus adapted for receiving and relating messages and with which will be associated a multitude of subscriber telephones as exemplified by the telephone 12, preferably of the dial type. Central station 10 is provided with telephone lines 14 and 16 for the receipt and transmission of signals which may include, by way of example, dial tone signals, dialing signals and voice or conversation signals. Lines 14 and 16 are normally connected directly with telephone lines 18 and 20 connected to telephone 12, but in accordance with the invention, these lines are connected by means of a relay 22.

Relay 22 includes a coil or winding 24 and switch elements 26, 28 and 30. Switch element 26 includes contacts 32 and 34 and switch blade 36. Switch element 26 includes contacts 38 and 40 and switch blade 42. Switch element 30 includes contacts 44 and 46 and switch blade 48. Normally switch blades 36, 42 and 48 are in engagement with contacts 32, 38 and 44 respectively. Accordingly line 14 is normally connected via switch blade 42 and contact 32 to line 18 and line 16 is connected via switch blade 48 and contact 44 to line 20.

Lines 50, 52 and 54 are respectively connected to contacts 34, 40 and 46. The purpose of these lines will hereinafter be made apparent. Switch blade 36 is connected to a line 56, the purpose of which will also be hereinafter made apparent.

The invention is intended to operate under the control of a disturbance detection device such as the device 58 which is connected to power source 60. Any conventional detection device and power source may be employed provided that the detection device will be sensitive to certain disturbances to render the power source 60 effective. Disturbances which may control the apparatus of the invention are such as fires, burglaries, earthquakes and so forth.

Disturbance device 58 and power source 60 are respectively coupled to lines 62 and 64. In line 62 is positioned a timing mechanism 66. This device is a switching device which is normally closed. However, when the disturbance detection device, which also functions in the manner of a switch, renders power source 60 effective, the timer 66 commences the determination of a determinable time period through a clock mechanism (not shown) which opens the related switch in timer 66 after a fixed period of time so that the line 62 is then opened. This means, as will become apparent hereinafter, that the apparatus of the invention will be effective for a certain period of time after its operation and then it will be restored to inactive condition.

A manually operable switch 68 is included in line 64 and thus as well it is possible to render the apparatus of the invention inactive as desired. Lines 62 and 64 are connected across the coil 24 of relay 22. Line 62 is, moreover, connected to line 56. Additionally, two further lines 70 and 72 are coupled to the lines 62 and 64 respectively.

Lines 52 and 54 are connected to a telephone transmitter energy means 74. This means is a conventional and commercially available telephone transmitter unit which is normally a part of commercially employed dialing apparatus. The particular unit envisaged and diagrammatically illustrated is known as Bell System No. 425B. This unit includes terminals L1 and L2, G, R, B, GN, C, RR, F, K and A. Of these terminals only terminals L1, L2, R, B, RR and F are employed in accordance with the invention. Terminal L1 is connected via a conventional internal circuit 76 to terminal B. Terminal L2 is connected via conventional internal circuit 78 to terminal R. L2 is similarly connected via conventional internal circuit 80 to terminal RR and terminal L1 is connected via conventional internal circuit 82 to terminal F.

The unit 74 works as follows: a dial tone signal received from the central station will be received at terminals L1 and L2 and transmitted to terminals R and B. A dialing signal which will be received from an associated dial, as appears more fully hereinunder, will be transmitted via terminals R and F to terminals L1 and L2. When an operator responds to the dialing signal at the central station, circuits 76 and 78 will then be cleared to receive a sound or message signal via terminals R and B, which signals will then be transmitted via terminals L1 and L2. This entire arrangement is all conventional and does not constitute a part of the present invention except as the unit is embodied in the improved apparatus to provide an operable embodiment.

Lines 50 and 72 are connected to a message relating device 84 which can be any conventional type of device such as a tape recorder having therein a magnetic tape on which is recorded a warning message such as, for example, "Please call the police. There has been a burglary at 222 Main Street." Device 84 receives power for operation via lines 50 and 72.

Diagrammatically illustrated within the device 84 is the operating circuit 86 connected via lines 88 and 90 to jack 92. Jack 92 is connected via lines 94 and 96, as well as further apparatus to be later described, to terminals B and R. A dial tone signal transmitted along lines 94 and 96 will thus pass through jack 92 and the circuit 86 of message relating device 84.

Additionally provided in accordance with the invention is a relay 98 which includes a switch element 100 in turn including contacts 102 and 104 and switch blade 106. Relay 98, moreover, comprises a core or winding 108 which is effective through core 110 to operate switch blade 106. A variable resistor 112 connects winding 108 to the jack 92 and provides for adapting the circuit to various commercially available types of message relating devices when employed.

A third relay 114 is also employed in accordance with the invention, this relay including a coil or winding 116 and a switch element 118 constituted by contacts 120 and 122, as well as a switch blade 124. A battery, or other source of electrical energy 126 is connected via a line 128 to contact 122 on the one hand and to switch blade 124 on the other hand. Relay 114 is of the type which remains in fixed position after operated so that manual restoration or reversed operation is required to restore it to its original condition.

Winding 116 of relay 114 is connected via line 130 to motor 132 which is further connected via line 134 to switch 136. Switch 136 is connected in turn to line 70 mentioned above.

Motor 132 is mechanically connected to a conventional dial 138 by means of a mechanical link 140 diagrammatically illustrated. Attached to dial 138 is a lug 142, the purpose of which is to operate switch 136 by engaging the lever 144 of the latter when the dial 138 has been appropriately rotated by motor 132.

Lines 146 and 148 diagrammatically indicate the connection between dial 138 and terminals RR and F of unit 74. Operation of dial 138 will transmit a dialing signal via lines 144 and 148 to terminals RR and F and thence to the central station 10.

The above apparatus, moreover, includes the feature whereby line 50 is connected to terminal 42 of relay 22 whereby line 50 may be selectively opened or closed.

The above described apparatus functions as next described hereinunder. Normally central station 10 is connected via lines 14 and 16 and lines 18 and 20 to the subscriber telephone 12 which may then operate in conventional manner as is well known.

The detection of a disturbance by detection device 48 couples power source 60 effectively to the winding 24 of relay 22 and switch blades 36, 42 and 48 leave their normal position as illustrated and move to engage the contacts 34, 40 and 46 respectively. Telephone 12 is therefore cut off or isolated from central station 10 and lines 52 and 54 are connected in substitution to said central station. At the same time the actuation of detection device 58 couples the power of source 60 to lines 70, 72 and 56 and the latter line is coupled by a switch blade 36 to line 50.

As a result of the above, a dial tone appears at terminals L1 and L2, operating power is supplied to message relating device 84 and power is transmitted as far as the switch blade 106 of relay 98. It does not, however, at this time proceed to the relay 114.

The dial tone passes through circuits 76 and 78, terminals R and B and thence via line 96 through winding 108 and resistor 112 to the jack 92 and circuit 86 in the message relating device 84. Resistor 112 is adjusted to permit the conventional magnitude of the dial tone sound to operate winding 108, taking into account the internal impedance of circuit 86. Therefore if there is a delay in the appearance of the dial tone from central station 10 as is sometimes the case, the operation of relay 98 will be deferred until such dial tone signal appears.

When the dial tone signal appears relay 98 is operated, thus connecting line 72 to coil 116 of relay 114 operating this relay and connecting battery 126 in series with lamp 128 whereby the latter is operated to constitute an indication that the apparatus of the invention has been actuated.

Current passes through winding 116 to motor 132 which is thereby operated since switch 144 is normally closed. Motor 132 rotates dial 138 until lug 142 is brought into engagement with lever 144 of the switch 136. At this time the circuit is opened and motor 132 deactivated. Dial 138 is then conventionally restored to its normal position of rest.

The dial signal is transmitted from dial 138 via lines 146 and 148 to terminals RR and F and thus via circuits 80 and 82 to terminals L1 and L2 respectively. From L1 and L2 the signals pass via lines 52 and 54 and via relay 22 to central station 10.

When the operator responds to the dialing signal and makes connection with lines 14 and 16, the connection in unit 74 to lines 146 and 148 is automatically terminated. The message signal generated in message relating device 84 is now automatically transmitted from circuit 86 through lines 94 and 96 to terminals B and R and thence via circuits 76 and 78 to terminals L1 and L2 and from these terminals to the central station 10 as indicated previously in respect of the dialing signals.

The operator will then receive the warning message of the type indicated above.

The above circuit is operative but subject to one possible source of interference, namely incoming telephone calls which will of course prevent the dial tone signal from arriving at relay 98 so that the apparatus of the invention cannot be completely activated. To avoid the consequences of this problem, the apparatus of FIG. 2 is employed. Said apparatus is included in lines 62 and 64 of FIG. 1 wherein these lines are now designated as lines 62A and 62B respectively and lines 64A and 66B respectively.

The apparatus of FIG. 2 includes a motor 150 having a wiper or rotatable armature 152 cooperating with a conductive segment 154. Segment 154 is adapted for connection to line 16. Wiper 152 is connected through motor 150 to a line 156 adapted for connection to line 14.

Two switches 158 and 160 are employed, switch 158 being normally closed and switch 160 being normally opened. These switches respectively comprise levers 162 and 164 connected together by a yoke 166 so that the operation of switch 162 provides operation of switch 164. Wiper 152 is adapted to brush over conductive segment 154 for a limited period of time after which the wiper 152 leaves the segment 154 and engages lever 162 thereby opening switch 158 and closing switch 160.

When an alarm disturbance causes the operation of device 58 in FIG. 1, a voltage is placed on lines 62A and 64A. Motor 150 is operated because switch 158 is closed. Wiper 152 is rotated to make contact with segment 154 thus shorting line 156 and segment 154. This short circuits lines 14 and 16 of FIG. 1 and automatically terminates communication thereon as is well known.

Wiper 152 is caused to move past segment 154 having permanently terminated any incoming call and operates switch 162 to open the same. Motor 150 is stopped and switch 160 is closed. The voltage on line 64A thus passes to line 64B and line 62B is directly connected to line 62A. The voltage on lines 62B and 64A is transmitted to coil 24 of relay 22 as well as to lines 56, 70 and 72.

Any incoming call is thus terminated and power is now supplied to the apparatus of the invention for the operation thereof.

There will now be obvious to those skilled in the art many modifications and variations of the apparatus of the invention set forth above. These modifications and variations will not depart from the scope of the invention as defined by the following claims.

What is claimed is:

1. Apparatus for use with a central telephone station comprising a telephone, first relay normally connecting said telephone to said central station, a power source, detection means sensitive to disturbances to couple said power source to said relay to render said relay effective to switch said telephone from said central station, a message relating means coupled to said power source and actuated by said detection means, a second relay, a telephone transmitter switching means coupling said first relay to said second relay, said message relating means being coupled to said second relay and said telephone transmitter switching means, said power source being coupled to said second relay, means to actuate said second relay, a motor coupled to the second relay and upon actuation of the latter being coupled to said power source, and dial means coupled to said transmitter switching means and adapted to transmit dialing signals via the same to said first relay and to said central station, said dial means being connected to and driven by said motor whereby, when said detector means is actuated and a dial tone signal transmitted to the second relay, the motor is actuated by said power source and the message relating means is actuated and coupled to said central station.

2. Apparatus as claimed in claim 1 comprising control means for terminating incoming calls to clear the central station for said message relating means; said control means comprising a control motor coupled to said power source and detection means, a first control switch coupled to said control motor and power source and normally closed so that said control motor can be actuated by said detection means and power source, a conductive segment coupled to said central station, a wiper driven by said control motor and coupled to the central station, said wiper being wiped across said segment to cause a temporary short and thereby terminate any incoming call being received from the central station and being further driven by the control motor to contact and operate said first control switch to open the same, and a second control switch operated by said wiper when said first control switch is operated to couple the power source to the message relating means.

3. Apparatus as claimed in claim 1 comprising means to render the power source ineffective to operate said first relay and message relating means.

4. Apparatus for use with a central telephone station comprising a telephone, first relay normally connecting said telephone to said central station, a power source, detection means sensitive to disturbances to couple said power source to said relay to render said relay effective to switch said first lines from said central station, a message relating means coupled to said power source and actuated by said detection means, a second relay including a coil and switch, a telephone transmitter switching means coupling first relay to the coil of said second relay, an adjustable resistor coupling said coil to said message relating means and the latter being coupled to said telephone transmitter switching means, said power source being coupled to the switch of said second relay, means to actuate said second relay, a motor coupled to the switch of the second relay and upon actuation of the latter being coupled to said power source, and dial means coupled to said transmitter switching means and adapted to transmit dialing signals via the same to said first relay and central station, said dial means being connected to and driven by said motor whereby, when said detector means is actuated and a dial tone signal transmitted to the coil of the second relay, the motor is actuated by said power source and the message relating means is actuated and coupled to said central station.

5. Apparatus for use with a central telephone station comprising a telephone, first relay normally connecting said telephone to said central station, a power source, detection means sensitive to distiurbances to couple said power source to said relay to render said relay effective to switch said telephone from said central station, a message relating means coupled to said power source and actuated by said detection means, a second relay including a coil and switch, a telephone transmitter switching means coupling said first relay to the coil of said second relay, an adjustable resistor coupling said coil to said message relating means and the latter being coupled to said telephone transmitter switching means, said power source being coupled to the switch of said second relay, a third relay including a winding coupled to the switch of the second relay and further including a switch, a warning light coupled to the latter said switch and actuated thereby, means to actuate said second relay, a motor coupled to the winding of the third relay and upon actuation of the second relay being coupled to said power source, and dial means coupled to said transmitter switching means and adapted to transmit dialing signals via the same to said first relay and to said central station, said dial means being conneced to and driven by said motor whereby, when said detector means is actuated and a dial tone signal transmitted to the coil of the second relay, the motor is actuated by said power source and the message relating means is actuated and coupled to said central station.

6. Apparatus for use with a central telephone station comprising a telephone, first lines adapted for connection to said station to transmit a dial tone signal, dialing signals and voice signals, second lines connected to said telephone, a first relay normally connecting said first lines to said second lines, third and fourth lines, a power source, detection means sensitive to disturbances to couple said power source to said relay and to said third lines, said relay being effective on connection to said power source to switch said first lines from said second lines to said fourth lines, a message relating means coupled via said third lines to said power source and actuated by said detection means, a second relay including a coil and switch, a telephone transmitter switching means coupling said fourth lines to the coil of said second relay, an adjustable resistor coupling said coil to said message relating means and the latter being coupled to said telephone transmitter switching means, said third lines being coupled to the switch of said second relay, a third relay including a winding coupled to the switch of the second relay and further including a switch, a warning light coupled to the latter said switch and actuated thereby, a motor coupled to the winding of the third relay and upon actuation of the second relay by said dial tone signal being coupled via said third lines to said power source, and dial means coupled to said transmitter switching means and adapted to transmit dialing signals via the same to said fourth lines, said dial means being connected to and driven by said motor whereby, when said detector means is actuated and a dial tone signal transmitted to the coil of the second relay, the motor is actuated by said power source and the message relating means is actuated and coupled to said first lines.

7. For use with a power source, a message relating means adapted for being actuated by said power source, and a disturbance detection means adapted for coupling the power source to the message relating means whereby the latter is actuated to transmit a message via telephone lines to a central station, apparatus for terminating incoming calls on said telephone lines to clear the latter for said message relating means, said apparatus comprising a motor coupled to said power source and detection means, a first switch coupled to said motor and power source and normally closed so that said motor can be actuated by said detection means and power source, a conductive segment coupled to one of said telephone lines, a wiper driven by said motor and coupled to the other of the telephone lines, said wiper being wiped across said segment to short the telephone lines temporarily and thereby terminate any incoming call thereon and being further driven by the motor to contact and operate said first switch to open the same, and a second switch operated by said wiper when said first switch is operated to couple the power source to the message relating means.

8. For use with a power source, a message relating means adapted for being actuated by said power source, and a disturbance detection means adapted for coupling the power source to the message relating means whereby the latter is actuated to transmit a message via telephone lines to a central station; apparatus for terminating incoming calls on said telephone lines to clear the latter for said message relating means, said apparatus comprising a motor coupled to said power source and detection means, a first switch coupled to said motor and power source and normally closed so that said motor can be actuated by said detection means and power source, shorting means operated by said motor to temporarily short the telephone lines and thereby terminate any incoming call thereon and being further driven by the motor to contact and operate said first switch to open the same, and a second switch operated by said motor when said first switch is operated to couple the power source to the message relating means.

References Cited

UNITED STATES PATENTS

| | | | |
|---|---|---|---|
| 3,109,894 | 11/1963 | Humphreys | 179—5 |
| 3,342,938 | 9/1967 | Benedict | 179—5 |

ROBERT L. GRIFFIN, *Primary Examiner.*

J. T. STRATMAN, *Assistant Examiner.*